TAPE APPARATUS AND CARTRIDGE

Filed Feb. 11, 1966 3 Sheets-Sheet 1

INVENTOR.
K. REY SMITH II
BY
Flehr and Swain
ATTORNEYS

Feb. 6, 1968 K. R. SMITH II 3,367,592

TAPE APPARATUS AND CARTRIDGE

Filed Feb. 11, 1966 3 Sheets-Sheet 2

INVENTOR.
K. REY SMITH II

BY

Flehr and Swain
ATTORNEYS

TAPE APPARATUS AND CARTRIDGE

Filed Feb. 11, 1966 3 Sheets-Sheet 3

INVENTOR.
K. REY SMITH II
BY
Flehr and Swain
ATTORNEYS 3,367,592
TAPE APPARATUS AND CARTRIDGE
Kobert Rey Smith II, 24119 Summerhill Ave., Los Altos, Calif. 94022
Filed Feb. 11, 1966, Ser. No. 526,756
12 Claims. (Cl. 242—55.13)

This invention relates generally to a tape apparatus and cartridge and more particularly to a dictation unit and cartridge.

Portable dictation units have in the past been relatively large and heavy. In recent years, there have appeared on the market several magnetic tape dictation units which are relatively small and light. A few of these units include a self-contained microphone-speaker and are adapted to be held in one hand for dictation. Rewind and playback are provided to permit listening to the dictation and making necessary corrections.

Even though the units can be held in the hand, the controls are not easily operated by the holding hand. Often, both hands are required to operate the units. Even these units are too large and heavy to be conveniently carried in the pocket.

It is a general object of the present invention to provide an improved tape apparatus.

It is another object of the present invention to provide a light, compact and relatively thin magnetic tape apparatus.

It is a further object of the present invention to provide a dictating unit which can be held in and easily operated by one hand.

It is still a further object of the present invention to provide a tape apparatus adapted to receive cartridges of the reel-to-reel or closed loop type.

It is still a further object of the present invention to provide a tape apparatus which is easily loaded and unloaded.

It is still a further object of the present invention to provide a tape apparatus which is simple in construction.

It is still a further object of the present invention to provide a tape cartridge particularly suitable for use in tape apparatus.

It is a further object of the present invention to provide a reel-to-reel tape cartridge having coaxial reels.

It is still a further object of the presnt invention to provide a system wherein cartridges are interchangeable with other tape apparatus.

The foregoing and other objects of the invention will become more clearly apparent from the following description when taken in conjunction with the accompanying drawing.

Referring to the drawing.

Figures 1, 1A:
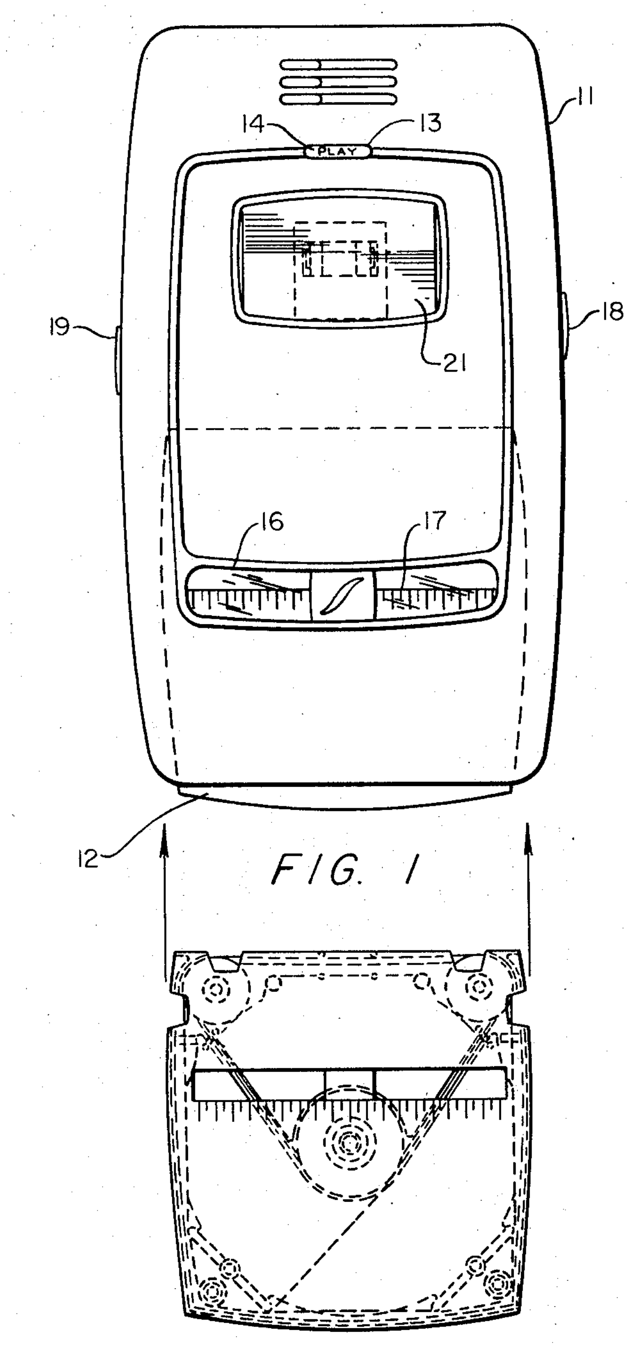
FIGURE 1 is a plan view of a tape apparatus in accordance with the present invention.
FIGURE 1A is a plan view of a cartridge adapted for use in the apparatus of FIGURE 1.
Figure 2:
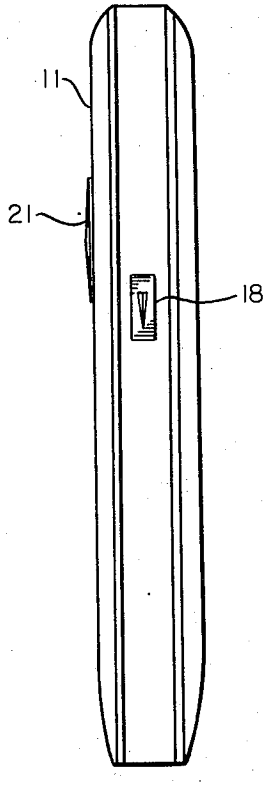
FIGURE 2 is a side elevational view of the unit shown in FIGURE 1.

Referring particularly to FIGURES 1 and 2, the apparatus includes a case or housing 11 which houses the operating mechanism, electrical and electronic circuits, microphone-speaker and batteries. The housing is open at one end to receive a tape cartridge 12. When a tape cartridge is inserted, it cooperates with the operating mechanisms to draw the tape-like recording medium past the transducing means to selectively record or playback.

The top cover of the housing includes a first window 13 which is adapted to expose a portion of a slide, to be presently described, which carries indicia 14 indicating the mode of operation of the device. For example, in the position shown, the devic is serving to reproduce or playback the information recorded on the tape-like medium. The top plate also includes a second window 16 which is adapted to expose a dial 17 formed on the cartridge. As will be presently described, the dial provides a means for indicating the elapsed time.

A volume control knob 19 may extend from one side whereby it can be easily rotated by the thumb for testing the volume of the device. A latch handle 18 may extend from the other side of the housing to permit opening of the back of the apparatus for inserting batteries.

A thumb-operated button 21 is adapted to move over the top plate. It extends through the housing and engages a slide, to be presently described. The position of the slide determines the mode of operation of the unit as, for example, record, play back or rewind.

Figure 3:
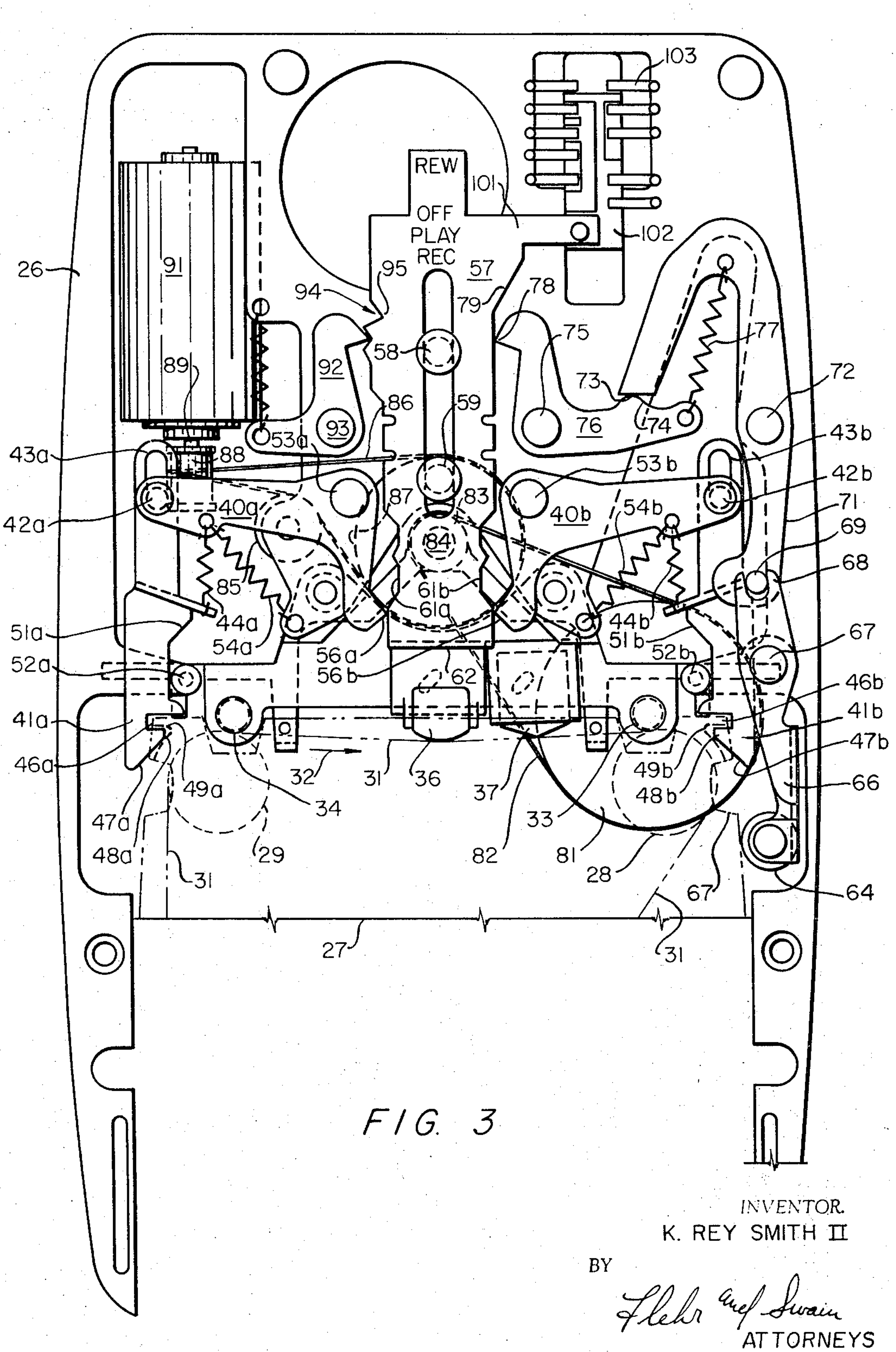
FIGURE 3 is an enlarged top view of tape apparatus with the top cover removed to expose the operating mechanisms.

An enlarged view of the apparatus is shown in FIGURE 3. The top cover is removed to expose the internal mechanisms and parts. Immediately beneath the top plate and carried by the side walls of the housing is a mounting plate 26 which mounts and supports the various levers and slides forming the mechanism for engaging and moving the cartridge and selecting the mode of operation.

The front portion of a magnetic cartridge 27, to be presently described in detail, is shown in broken line. The cartridge includes internal spaced pinch wheels 28 and 29 over which the tape 31 passes as it is drawn from the supply reel and wound onto the take-up reel, to be presently described. The tape normally moves in the direction of the arrow 32 in the playback and record mode. Pinch wheel 28 is engaged by the capstan 33, and the pinch wheel 29 is engaged by an idler pulley 34 when the cartridge is in the position illustrated. The portion of tape 31 extending between the two pinch wheels passes in cooperative relationship with erase head 36 and record head 37. The tape is supported in a so-called tight loop between the two pinch rollers.

It should be apparent that the apparatus need not include an idler or second capstan. The tape extending between the two pinch wheels would be supported by the reel drive belt, to be presently described.

The cartridge is held within the apparatus by the spring-loaded spaced levers 41*a*, 41*b*, which are mounted on crank arms 40*a*, 40*b* by pins 42*a*, 42*b*, respectively. The pins 42*a*, 42*b* extend through elongated slots 43*a*, 43*b* to permit longitudinal movement of the levers. The levers are engaged by springs 44*a*, 44*b* which tend to pull the cartridge inwardly to assure competent pressure between the capstan and idler rollers 33, 34, and the pinch wheels 28 and 29, respectively.

When the cartridge is first inserted into the apparatus, the cartridge surfaces 46*a*, 46*b* engage the inclined surfaces 47*a*, 47*b* on the end of the levers and pivot the levers outwardly. As soon as the surfaces 46*a*, 46*b* pass beyond the lever noses 48*a*, 48*b*, the levers are rotated inwardly by the springs 44*a*, 44*b*, so that the noses 48*a*, 48*b* are accommodated within the notches 49*a*, 49*b*. The levers yieldably hold the cartridge with the pinch wheels in cooperative relationship with the capstan and idler roller, and the tape with the magnetic heads.

To remove the cartridge from the apparatus, it is pulled outwardly. This serves to move the levers 41*a*, 41*b* longitudinally until the cam surfaces 51*a*, 51*b* engage pins 52*a*, 52*b*. The levers are then cammed outwardly and disengage the nose 48 from the notch 49 and permit removal of the cartridge.

As previously described, the pins 42*a* and 42*b* are carried at the end of one arm of the cranks 40*a*, 40*b*. The cranks 40*a*, 40*b* are pivotally supported on the plate 26 by pins 53*a*, 53*b*. Springs 54*a*, 54*b* yieldably urge the ends of the cranks 40*a*, 40*b* to rotate in counter-clockwise and clockwise directions, respectively. The other ends of the cranks 40*a*, 40*b* include points 56*a*, 56*b* which are adapted to ride on the side surfaces of select slide 57.

The slide 57 is supported on spaced pins 58, 59 carried on the top plate and is adapted to slide longitudinally to select the mode of operation of the apparatus. In the position shown, the mode of operation is the play mode. In this position of the slide, the arms 40*a*, 40*b* are rotated in their maximum clockwise and counter-clockwise position, respectively, whereby the levers 41*a*, 41*b* are completely retracted to bring the pinch wheels 28 and 29 and the tape into engagement with the operating parts of the apparatus.

It is to be noted that in the record position, with the slide moved upwardly to the next position, the levers 40*a*, 40*b* remain in the same position, and the tape and pinch wheels or the cartridge are still in engagement with the operating mechanism of the apparatus.

If a slide is moved in the opposite direction to an intermediate position, ends 56*a*, 56*b* of the levers ride downwardly into the notches 61*a*, 61*b*, respectively, and the cranks 40*a*, 40*b* rotate in the counter-clockwise and clockwise direction, respectively. This allows the levers 41*a*, 41*b* to move downwardly, as viewed in the figure, and bring the pinch wheels 28 and 29 out of engagement with the capstan 33 and idler roller 34, respectively, and the tape out of engagement with the heads. Simultaneously, the electrical circuits are operated to turn the apparatus off.

In order to playback previously recorded signals, for example, previously dictated information, means are provided to rewind the tape prior to placing the machine in its playback mode. To go into rewind, the cartridge is brought forward slightly and then forced outwardly by the levers 41*a*, 41*b*. The levers are driven by rotation of the cranks 40*a*, 40*b* as the ends 56*a*, 56*b* ride in the notches 61*a*, 61*b*. The outward movement of the cartridge brings the pinch wheel against the idler wheel 64 which, in the meantime, has been brought into engagement with the capstan flywheel 81.

The idler wheel 64 is rotatably mounted on the end of lever 66 which is pivotally supported on the plate 26 by pin 67. The other end of the lever includes a bifurcated end 68 which engages a pin 69 carried on lever 71. The lever 71 is pivotally mounted on the plate 26 by pin 72 and is bent over to provide an abutting surface 73 which abuts against the portion 74 of lever 76. A spring 77 holds the end 73 in abutment with the portion 74. The lever 76 is pivotally supported on plate 26 by pin 75. The other end of the lever 76 includes a point 78 adapted to engage the sides of the select slide 57 and, in the rewind position, slides along the cam surface 79 whereby to rotate the lever 76 clockwise. This, in turn, rotates the lever 71 counter-clockwise and the lever 66 clockwise to move the idler 64 inwardly to engage the capstan pulley 81 and the pinch wheel 28. This drives the tape in an opposite direction for rewind. It is to be noted that the capstan flywheel has a much greater diameter than the capstan. As a result, the tape is driven at a much faster velocity in the rewind mode.

The capstan pulley 81 is driven by a belt 82 which engages pulley 83 carried on shaft 84 rotatably mounted on the plate 26. The shaft 84 is, in turn, driven by belt 86 which extends between flywheel 87 and pulley 88 carried on the shaft 89 of the drive motor 91. The belt

86 is twisted through a 90° angle to thereby transmit rotary motion between the pulley 88 and the flywheel 87. An intermediate idler 85 is inserted in the drive system to permit reversing the motor to reverse the capstan drive.

In its normal operation, the capstan 33 carried by the pulley 81 serves to drive the tape in the forward direction. However, in the rewind as previously described, there is interposed the idler 64 which serves to engage the pulley 81 and pinch wheel 28 to drive the tape in an opposite direction.

Detent means are provided for holding the slide 57 in selected position. For this purpose, a lever 92 carried on plate 26 by pin 93 engages notches 94 formed on the sides of the slide. The end of the lever 92 is shown engaging the notch corresponding to the play position. It is seen that the notch 95 corresponding to the off position is relatively deep. This is provided to give a positive indication that the slide is in the off position. Further, considerably more pressure is required to move the slide to the play or record position than to the rewind position, again assuring that the apparatus does not easily go into the record mode where previously recorded material might be erased. The first position is the playback position providing further safety.

Referring again to the slide 57, it includes an outwardly extending arm 101 which carries slide 102. The slide 102 includes a plurality of switch fingers which serve to engage the contacts 103 to select the operating mode of the electronic and electrical circuits associated with the apparatus to assure that the proper circuits are operative for playback, record and rewind.

Figure 7:
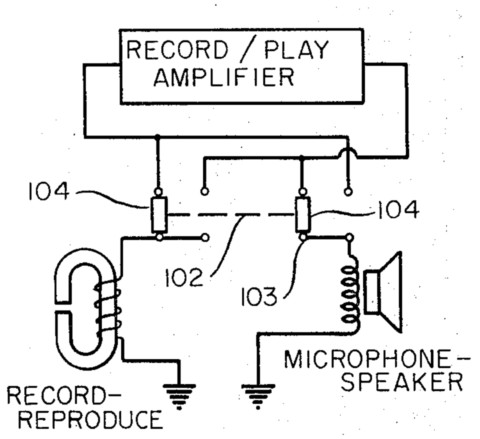
FIGURE 7 is a schematic block diagram of the electrical circuits of the present invention.

Referring particularly to FIGURE 7, the slide 102 includes a pair of fingers 104 which are adapted to selectively engage the contacts 103. In the position to the slide shown, the record-reproduce head is connected to the amplifier which feeds an amplified signal to the microphone-speaker.

With the slide 102 moved to the other position, the connections are such that the microphone-speaker output is applied to the amplifier and the amplified signals are applied to the record-reproduce head for recording.

In the rewind position, there is no connection to the electrical recording-reproducing circuits. The connection is merely such as to cause the motor to operate and drive the capstan idler.

Thus, there has been provided a machine which is compact, thin, light and easy to manipulate and operate. The complete operation of the machine requires sliding movement of a single lever for selecting the record, playback and rewind modes.

Figure 4:
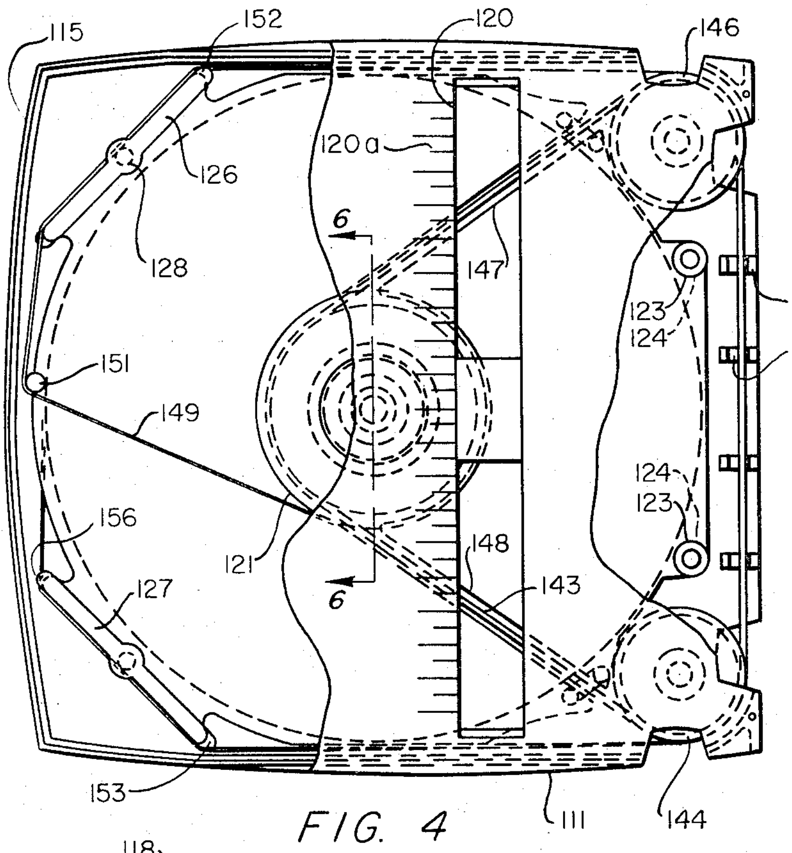
FIGURE 4 is an enlarged plan view of a tape cartridge incorporating features of the present invention.
Figure 5:
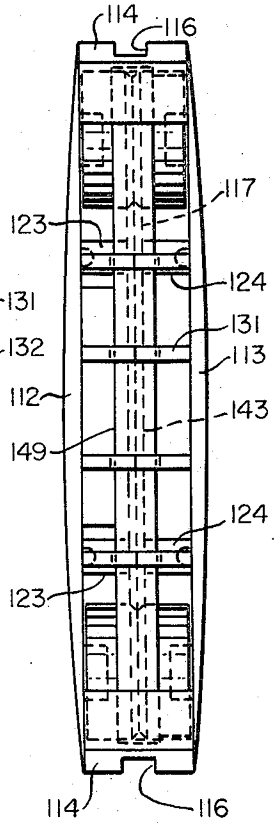
FIGURE 5 is an end elevational view of the cartridge shown in FIGURE 4.
Figure 6:
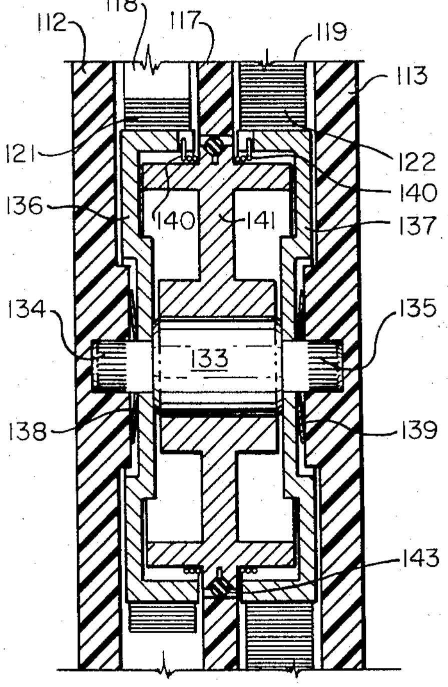
FIGURE 6 is an enlarged partial sectional view taken along the line 6—6 of FIGURE 4.

Referring now to FIGURES 4, 5 and 6, there is shown a tape cartridge particularly suitable for use in a machine of the type described. The cartridge is a so-called reel-to-reel cartridge, that is, the magnetic tape is supplied from a supply reel and taken up on a take-up reel in contrast to a continuous or mobius loop tape cartridge in which the tape is drawn from the center of a single roll and rewound on the outside of the same roll. It is, of course, to be understood that the machine is adaptable to accommodating both kinds of tape cartridges. A reel-to-reel cartridge is particularly suitable in dictation since it permits rewind to edit; whereas in a mobius or continuous loop cartridge, rewinding of the tape is not provided.

Referring to the drawings, the cartridge includes a housing 111 having top and bottom walls 112, 113, side walls 114 and end wall 115. The side walls 114 include a longitudinal groove 116 which is adapted to be engaged by bars or pins for guiding the cartridge as it is inserted into associated apparatus, such as apparatus of the type just described. The cartridge may be fabricated from plastic material, as by molding. For example, a portion of the side walls and the top and bottom walls may be formed, and then the two parts joined to form the cartridge housing 111. The walls of the cartridge may include a window or opening 120 through which the tape roll may be viewed to give a visual indication of the amount of tape on the roll. The edge of the opening may include markings 120*a* for giving a rough indication of the percent of tape on the roll.

The cartridge includes a center plate 117 which divides the cartridge into two compartments 118 and 119 for receiving the reeled tape rolls 121, 122, respectively. The center plate likewise may be formed from plastic material by molding. The center plate is formed to include spaced lugs 123 and 124 on opposite sides of one end. These lugs fit within one another to frictionally hold the two housing portions together and support the center plate between the top and bottom walls of the cartridge. Guides 126 and 127 are formed on the other end of the center plate. Interfitting means 128 hold the housing portions together. The guides 126 and 127 serve the further purpose of guiding the tape as it is moved from the supply to the take-up roll. The front end of the cartridge is open and includes a plurality of tape guiding posts 131. The guide posts may be formed integral with the top and bottom plates 112 and 113, each of the posts being notched 132 whereby when the magazine is assembled, the cooperating post portion defines an opening.

The walls 112, 113 accommodate an axle 133. The axle includes ends 134 and 135 which are accommodated in wells formed in the walls. Independently rotatable hubs 136 and 137 are mounted on the ends 134 and 135. Spring washers 138 and 139 are disposed between the hubs and respective walls to provide a friction drag. A driving pulley 141 is rotatably mounted on the main axle 133. A one-way drive means is provided to drive the hubs 136 and 137 from the pulley. The one-way drive means may, for example, comprise a pair of springs 140 coiled about the pulley and having one end in engagement with hubs 136 and 137. The springs are wound in opposite directions onto the pulley 141 whereby rotation in a particular direction serves to tighten one of the springs onto the pulley to provide a positive drive between the associated hub and pulley. The spring associated with the other hub is coiled and wound in an opposite direction whereby the pulley can rotate freely with respect to the pulley in this direction of rotation. When the pulley is rotated in an opposite direction, the action of the springs is reversed and the other hub is driven.

The pulley 141 is driven by a belt 143 which extends over pinch wheels 144, 146 and across the front of the apparatus. Thus, when the capstan engages the pinch wheel to drive the tape, it serves to drive the belt which, in turn, drives the pulley 141. This drives the take-up hub through spring 140 to take up the tape on the take-up roll. Any difference in rotational velocity of the pinch wheel and pulley will result in slippage of the spring. On the other hand, as the capstan pulls the tape from the supply roll, the hub is free to rotate, the only retarding friction being offered by the action of the spring washer disposed between the walls and hub.

Referring particularly to FIGURE 4, the belt 143 extends through slots 147 and 148 formed in the center plate. The plate is selected to have a thickness greater than the width of the belt whereby there is no interference between the tape rolls carried on opposite sides of the center plate and the belt. The belt passes through the guide openings behind the tape-like medium and, therefore, serves to provide a resilient back-up for the tape to urge the tape into engagement with associated magnetic heads extending into the open end of the cartridge.

Referring again to FIGURE 4, the tape 149 is shown being supplied from the upper reel. It then travels over a post 151 over the tape guide 126 which has edge 152 inclined so as to cause the tape to move downwardly to the center of the cartridge whereby it travels across the front of the cartridge in the center as shown in FIGURE 5. The tape leaving the pinch wheel 144 engages the inclined edge 153 of guide 127 and is urged further downwardly whereby the tape leaving the edge 156 travels in and is wound onto the lower roll.

Thus, it is seen that the drive capstan which engages the pinch wheel serves to provide the energy for driving the take-up hub. There is no necessity for take-up motors or other drive means. When the cartridge is in its rewind mode, the belt is driven in the opposite direction and serves to drive the upper reel while allowing the lower reel to rotate freely and supply the tape as required.

It is also to be observed that the cartridge is symmetrical whereby it may be turned over and the rolls of the supply and take-up hubs interchanged. This is particularly useful wherein the tape is recorded on multiple tracks, that is, where one recording channel is on one side of the center line of the tape and the other recording channel on the opposite side. In this manner, a complete recording may be made in one direction, the cartridge removed, turned over and re-inserted, and a recording made in the opposite direction thereby doubling the length of recording.

Thus, it is seen that there is provided a reel-to-reel cartridge adapted to operate through the action of the drive capstan only and yet in which the hub supporting the take-up roll is positively driven. The cartridge is compact and simple in construction.

I claim:

1. A tape apparatus adapted to receive a cartridge carrying tape extending over a pinch roller and selectively operate on the tape to record and reproduce signals therefrom comprising a housing having an opening adapted to receive said cartridge, a transducer mounted in said housing to cooperate with the magnetic tape presented thereto by a cartridge placed in said opening, a drive capstan assembly mounted in said housing to cooperate with the cartridge pinch roller to drive the tape past the transducing means, means carried in said housing for driving said capstan assembly, means for engaging and yieldably urging a cartridge inserted in said housing into cooperative engagement with said capstan assembly and said transducer whereby the capstan assembly cooperates with the pinch roller to drive the tape past the transducing means, a slide adapted to be moved to selected positions for controlling the apparatus to selectively record and reproduce from and rewind tape, and means cooperating between said slide and said cartridge engaging means to move the cartridge responsive to movement of the slide.

2. A magnetic tape apparatus as in claim 1 including means for disengaging the cartridge from said engaging means when it is pulled outwardly from said opening.

3. A magnetic tape apparatus as in claim 1 wherein said last named means serves to cooperate with said cartridge engaging means to move the cartridge out of engagement with the capstan drive assembly and the transducing means, and means for bringing an intermediate idler roll into engagement with the pinch roller and the capstan drive assembly to drive the tape in a reverse direction when the slide is moved to the rewind position.

4. A magnetic tape apparatus as in claim 1 wherein the means for driving the capstan comprises a motor disposed in said housing and having a pulley with its axis parallel to the walls of the housing, a flywheel assembly having its axis of rotation perpendicular to said walls, a belt extending between said pulley and flywheel assembly to drive the same, and a second belt extending between the flywheel assembly and the capstan assembly for driving the capstan assembly.

5. A tape cartridge for storing and presenting a tape medium to associated apparatus comprising a housing, a pair of hubs adapted to have the tape reeled thereon disposed in said housing, guide means including at least one roller carried in said cartridge to guide the portion of the tape extending between said hubs to present the tape to associated apparatus, said roller cooperating with a driven means on said apparatus to pull the tape from one hub, a drive pulley disposed in cooperative relationship with said hubs, a drive means engaging said drive pulley and said roller to drive the pulley from the roller, one-way drive means associated with each of said hubs and said drive pulley to drive one of said hubs to take up the tape in one direction of rotation of said pulley and to take up the tape on the other hub when the pulley rotates in the other direction.

6. A tape cartridge as in claim 5 wherein said drive means comprises a drive belt.

7. A tape cartridge as in claim 5 wherein friction drag means cooperate between the hubs and the housing to provide a frictional drag on the hub supplying tape.

8. A tape cartridge as in claim 6 wherein said hubs are disposed coaxially with the pulley and the drive belt is disposed in the space between said hubs.

9. A tape cartridge as in claim 6 wherein said cartridge housing includes a partition wall dividing the cartridge into first and second compartments, each of said compartments serving to accommodate one hub and a slot formed in said wall for accommodating the drive belt extending between the pulley and the roller.

10. A tape cartridge as in claim 6 wherein one end of the housing is open and a roller is disposed on each side of said opening.

11. A tape cartridge as in claim 10 in which said drive belt extends over said pulley and over each of said rollers and across said opening to thereby provide a backup for the tape extending between said rollers.

12. A tape cartridge as in claim 11 including guide means serving to guide the tape for movement from one reel to the other and to center the tape as it passes across the cartridge opening.

References Cited

UNITED STATES PATENTS

| | | | |
|---|---|---|---|
| 3,078,464 | 2/1963 | Lyon et al. | 242—55.13 |
| 3,195,826 | 7/1965 | Smith | 242—55.13 |
| 3,252,669 | 5/1966 | Geri | 242—55.13 |

LEONARD D. CHRISTIAN, *Primary Examiner.*